A. RANK.

Grave-Guard.

No. 9,009. Reissued Dec. 30, 1879.

Witnesses.
H. T. Parker.
T. Wells, Jr.

Inventor.
Amos Rank.
per. James A. Whitney
Att'y.

N. PETERS, PHOTO-LITHOGRAPHER, WASHINGTON, D. C.

UNITED STATES PATENT OFFICE.

AMOS RANK, OF SALEM, OHIO.

IMPROVEMENT IN GRAVE-GUARDS.

Specification forming part of Letters Patent No. 140,728, dated July 8, 1873; Reissue No. 9,009, dated December 30, 1879; application filed November 11, 1879.

*To all whom it may concern:*

Be it known that I, AMOS RANK, of Salem, in the county of Columbiana and State of Ohio, have invented in Improvement in Guards for Graves, &c., of which the following is a specification.

The invention is designed to furnish a simple and effective means of insuring the permanent symmetry of graves or burial-mounds by guarding them from the crumbling down of their sides or edges either from the effects of rains, frosts, or other natural agencies, or from trampling or the like, and also to provide a means of retaining the usual head and foot stones, and, when desired, the posts of a fence or railing, more securely and permanently in position than when set in the ground in the usual manner.

My said invention consists in the novel article of manufacture, a grave-guard formed of cast or molded material in such manner as to provide for the retention of symmetry and due shape to the grave, also for the proper permanent marking or identification of the same.

My said invention also comprises the construction of such a grave-guard with one or more openings, in which earth or soil may be provided for the growth of plants, shrubs, flowers, &c., for the adornment of the grave.

My said invention also comprises the construction of such a grave-guard with any suitable number of holes for the reception of posts for the support of a fence or railing around the grave.

Figure 1:
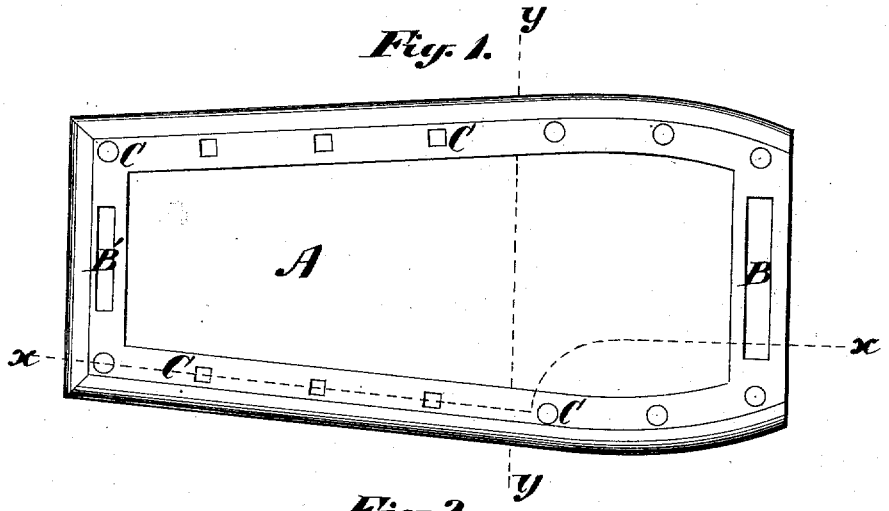
Figure 2:
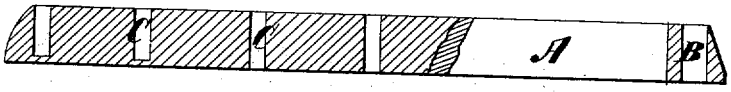
Figure 3:
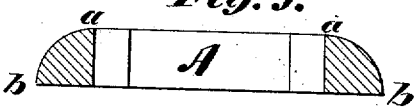

Figure 1 is a plan view of a guard for graves constructed according to my invention. Fig. 2 is a longitudinal vertical section taken in the line *x x* of Fig. 1. Fig. 3 is a vertical transverse section taken in the line *y y* of Fig. 1.

The guard is made with a circumferential contour, more or less closely corresponding to that of the grave to which it is to be applied, as indicated in Fig. 1. It is to be formed in a mold of any suitable form, and made either of metal cast in such mold, or of any artificial stone or cement, or equivalent material, shaped therein, and subsequently allowed or caused to harden. Its outermost portions should be made sloping, as shown more fully at *a b* in Fig. 3, in order that a symmetrical and pleasing appearance may be given to the edges of the grave.

The central or open portion, A, of the guard, when the latter is in use, is filled with the earth constituting the upper portion of the grave or mound, the surface of this earth being, preferably, rounded somewhat above the level of the upper surface of the guard, and sodded over or planted with flowers and shrubs.

The guard, thus arranged with reference to and surrounding that portion of the grave above the adjacent level, effectually supports the edges of the same and retains the mound in the symmetrical shape originally given it.

Formed vertically in one end of the guard is a rectangular slot or socket, B, of such size and shape as to receive and firmly hold the head-stone usually set upon graves, and in the opposite end of the guard is, when desired, a similar slot or socket, B′, for the reception, in like manner, of a stone for the foot of the grave.

Provided vertically in the guard, at the sides, and, when required, at the ends thereof, are holes C, constituting sockets for the reception of the lower ends of the posts of a fence or railing, which may be constructed to protect the flowers, &c., upon the grave from grazing or other animals having the run of the grave-yard or burial-place.

What I claim as my invention is—

1. As a new article of manufacture, a grave-guard or protective guard for a grave or grave-mound, made of cast or molded material, substantially as hereinbefore set forth.

2. A grave-guard made of cast or molded material, and constructed with a means, substantially as described, for holding the head or head and foot stones or marking-tablets, substantially as hereinbefore set forth.

3. A grave-guard or grave-protector made of molded or cast material, constructed with an opening in the top of the guard for the purpose of planting therein flowers, grasses, shrubs, or vines, substantially as hereinbefore set forth.

4. A grave-guard or grave-protector made of molded or cast material, constructed with one or more holes for the purpose of holding the posts of a fence, cresting, railing, or racks, substantially as hereinbefore set forth.

AMOS RANK.

Witnesses:
B. S. AMBLER,
J. C. BOONE.